US009245016B2

(12) United States Patent
Abe

(10) Patent No.: US 9,245,016 B2
(45) Date of Patent: Jan. 26, 2016

(54) INFORMATION DISPLAY APPARATUS AND RECORDING MEDIUM

(75) Inventor: Wataru Abe, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 200 days.

(21) Appl. No.: 13/412,703

(22) Filed: Mar. 6, 2012

(65) Prior Publication Data

US 2012/0246600 A1 Sep. 27, 2012

(30) Foreign Application Priority Data

Mar. 22, 2011 (JP) ................................ 2011-063206

(51) Int. Cl.
*G06F 17/30* (2006.01)
*G06F 17/27* (2006.01)
*G06F 3/0481* (2013.01)

(52) U.S. Cl.
CPC ...... *G06F 17/30737* (2013.01); *G06F 17/2735* (2013.01); *G06F 3/0481* (2013.01); *G06F 17/30864* (2013.01)

(58) Field of Classification Search
CPC .......... G06F 17/2735; G06F 17/30737; G06F 17/30864; G06F 3/0481
USPC ........................................................ 715/853
See application file for complete search history.

(56) References Cited

U.S. PATENT DOCUMENTS 6,509,974 B1 * 1/2003 Hansen ........................ 358/1.12
6,772,139 B1 * 8/2004 Smith, III ..................... 707/748
7,975,019 B1 * 7/2011 Green et al. .................. 709/217
2001/0027488 A1 10/2001 Hodgkin et al.
2001/0056418 A1 * 12/2001 Youn ................................ 707/3
2002/0035619 A1 * 3/2002 Dougherty et al. ........... 709/219
2005/0149853 A1 * 7/2005 Naitou ....................... 715/501.1
2007/0136318 A1 * 6/2007 Clark et al. ................... 707/100
2009/0303239 A1 * 12/2009 Ang et al. ..................... 345/440
2010/0235723 A1 * 9/2010 Nakajima .................... 715/205
2010/0257177 A1 * 10/2010 Yamamoto ................... 707/741

FOREIGN PATENT DOCUMENTS

JP 2010-061340 3/2010
JP 2010-211441 9/2010
KR 10-2008-0086217 9/2008

OTHER PUBLICATIONS

Office Action of Rejection for Korean Patent Application No. 10-2012-0028056 Dated Aug. 29, 2013, 7 pgs.
Japanese Office Action for Japanese Patent Application No. 2011-063206 mailed on Nov. 4, 2014.

* cited by examiner

*Primary Examiner* — Tuyetlien Tran
*Assistant Examiner* — Jaime Duckworth
(74) *Attorney, Agent, or Firm* — Amin, Turocy & Watson, LLP

(57) ABSTRACT

An apparatus comprises a module which stores document information to which content that includes link character strings linked to other items on an item basis is caused to correspond, a first display control module which displays content on an arbitrary item stored as first content according to a user operation, a second display control module which lists the link character strings included in the displayed first content and displays them together with the first content, a selection module which selects, according to a user operation, a link character string displayed, and a third display control module which displays content on an item stored in such a manner that the item is linked to the selected link character string.

4 Claims, 10 Drawing Sheets

JAPANESE HISTORY DICTIONARY
Azuchi Momoyama Period
The period when Nobunaga Oda and Hideyoshi Toyotomi took the reins of government. Named after Azuchi Castle, the residence of Nobunaga in Ohminokuni, and Fushimi Castle (Momoyama), the residence of Hideyoshi in his later life.
MAP
Nobunaga Oda
Hideyoshi Toyotomi
Azuchi Castle
Fushimi Castle

INFORMATION DISPLAY APPARATUS AND RECORDING MEDIUM

CROSS-REFERENCE TO RELATED APPLICATIONS

This application is based upon and claims the benefit of priority from prior Japanese Patent Application No. 2011-063206, filed Mar. 22, 2011, the entire contents of which are incorporated herein by reference.

BACKGROUND OF THE INVENTION

1. Field of the Invention

This invention relates to an information display apparatus and a recording medium.

2. Description of the Related Art

It is known that a conventional electronic dictionary device stores a character string to which information on a link to another item has been added (or a linked character string) in the contents of each item of a document content in advance and, when the linked character string is selected while the contents of an item is being displayed, reads and displays the contents of an item at the link destination. This enables the user to browse an item related to the linked character string instantly.

An electronic dictionary device with the function of creating the user's own link table has been proposed as follows (Jpn. Pat. Appln. KOKAI Publication No. 2010-211441). With the electronic dictionary device, while information on explanation (contents) of an arbitrary entry word is being displayed, the user not only specifies a character string of a passage in the explanatory information as a link source, but also displays another explanatory information, specifies it as a link destination, and stores them in the form of a table. In this way, the user's own link table is created. When displaying explanatory information, the user highlights the character string of the passage stored as the link source in the user's own link table and specifies the highlighted character string, enabling explanatory information at the link destination to be read and displayed.

However, with a conventional information display apparatus that displays document information, since linked character strings stored as link sources are scattered in a document, even if they are highlighted in a series of documents, they are difficult to find, causing the problem of making the selection of them complicated.

BRIEF SUMMARY OF THE INVENTION

It is an object of an embodiment of the invention to provide an information display apparatus and a control program for the apparatus which are capable of easily finding and selecting a character string to which information on a link to another item in a document has been added.

An information display apparatus according to an embodiment of the invention comprises an information storage module which stores document information to which content information that includes link character strings linked to other items on an item basis is caused to correspond, a first display control module which displays content information on an arbitrary item stored in the information storage module as first content information according to a user operation, a second display control module which lists the link character strings included in the displayed first content information and displays them together with the first content information, a selection module which selects, according to a user operation, a link character string displayed by the second display control module, and a third display control module which displays content information on an item stored in such a manner that the item is linked to the selected link character string.

A recording medium which records a program for controlling a computer according to another embodiment of the invention, the program causing the computer to function as an information storage module which stores document information to which content information that includes link character strings linked to other items on an item basis is caused to correspond, a first display control module which displays content information on an arbitrary item stored in the information storage module as first content information according to a user operation, a second display control module which lists the link character strings included in the displayed first content information and displays them together with the first content information, a selection module which selects, according to a user operation, a link character string displayed by the second display control module, and a third display control module which displays content information on an item stored in such a manner that the item is linked to the selected link character string.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
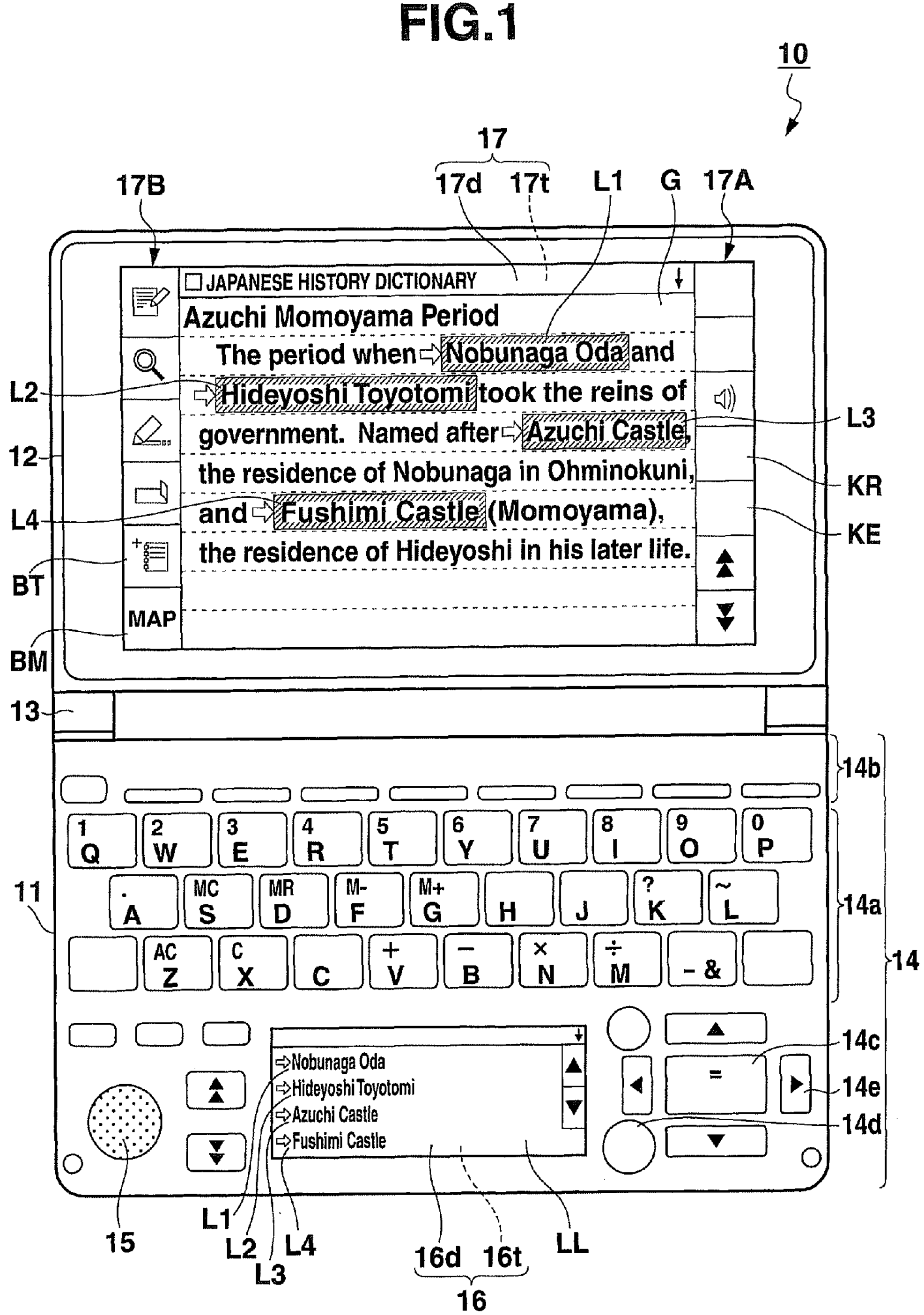
FIG. 1 is a front view showing an outer configuration of an electronic dictionary device 10 according to an embodiment of an information display apparatus of the invention.

FIG. 1 is a front view showing an outer configuration of an electronic dictionary device 10 according to an embodiment of an information display apparatus of the invention.

The electronic dictionary device 10 is configured as a portable device dedicated to an electronic dictionary explained below or as a personal digital assistant (PDA), a personal computer (PC), a cellular phone, an electronic book reader, a portable video game console, or the like each of which has a dictionary function.

The electronic dictionary device 10 is configured such that a body shell 11 and a cover shell 12 are conjoined via a hinge part 13 so as to form a foldable case that can be opened and closed. At the surface of the body shell 11 with the foldable case opened, there are provided a key input module (keyboard) 14 and a touch panel auxiliary display module 16. The key input module 14 comprises character input keys 14*a*, dictionary specify keys 14*b*, [Translate/Confirm] key 14*c*, [Return/List] key 14*d*, cursor keys 14*e*, and a speaker 15.

The auxiliary display module 16 has a structure where a display device and a touch position detecting device that detects a position touched by the user with a stylus, a finger, or the like are integrally formed. The auxiliary display module 16 is so configured that, for example, a transparent touch panel 16*t* is laid on a 256×64 dot color liquid-crystal display screen 16*d* on the front side of the central part of the key input module 14. An area of the auxiliary display module 16 is switched, as needed, to a handwriting character (kanji) input area for inputting a handwriting character, a key input area for specifying an input area or various functions, a display area for content (explanatory) information (G1 in FIG. 6C) read from a dictionary database 22*b* described later and a link list LL, or an area where these input areas are mixed.

A trace of handwriting input in the handwriting character input area switched on the auxiliary display module 16 is echoed back to the color liquid-crystal display screen 16*d*, which displays the trace.

At the surface of the cover shell 12, for example, a 480×320 dot touch panel main display module 17 with a backlight is provided on almost all the surface. Like the auxiliary display module 16, the main display module 17 has a structure where a display device and a touch position detecting device that detects a position touched by the user with a stylus, a finger, or the like are integrally formed. The main display module 17 is so configured that a transparent touch panel 17*t* is laid on a color liquid-crystal display screen 17*d*.

On the extreme right of the touch panel main display module 17, there is provided a touch key area 17A in which a key notation (e.g., [Translate/Confirm] key KE or [Return/List] key KR) for performing a touch operation instead of pressing a part of the keys on the key input module 14 has been printed fixedly.

On the extreme left of the touch panel main display module 17, there is provided a touch icon area 17B in which various icons for specifying an executable function by a touch operation according to an operation mode are displayed.

For example, in a normal dictionary search mode in which an entry word of a desired dictionary is retrieved and a content information display screen G that displays a description of the entry word is displayed on the main display module 17, [Wordbook] icon BT for entering the retrieved entry word in a wordbook, [Word map] icon BM for displaying, on the auxiliary display module 16, a link list LL that lists character strings (linked character strings) L1, L2, . . . to which link information included in displayed content information has been added, and the like are displayed in the touch icon area 17B.

Figure 2:
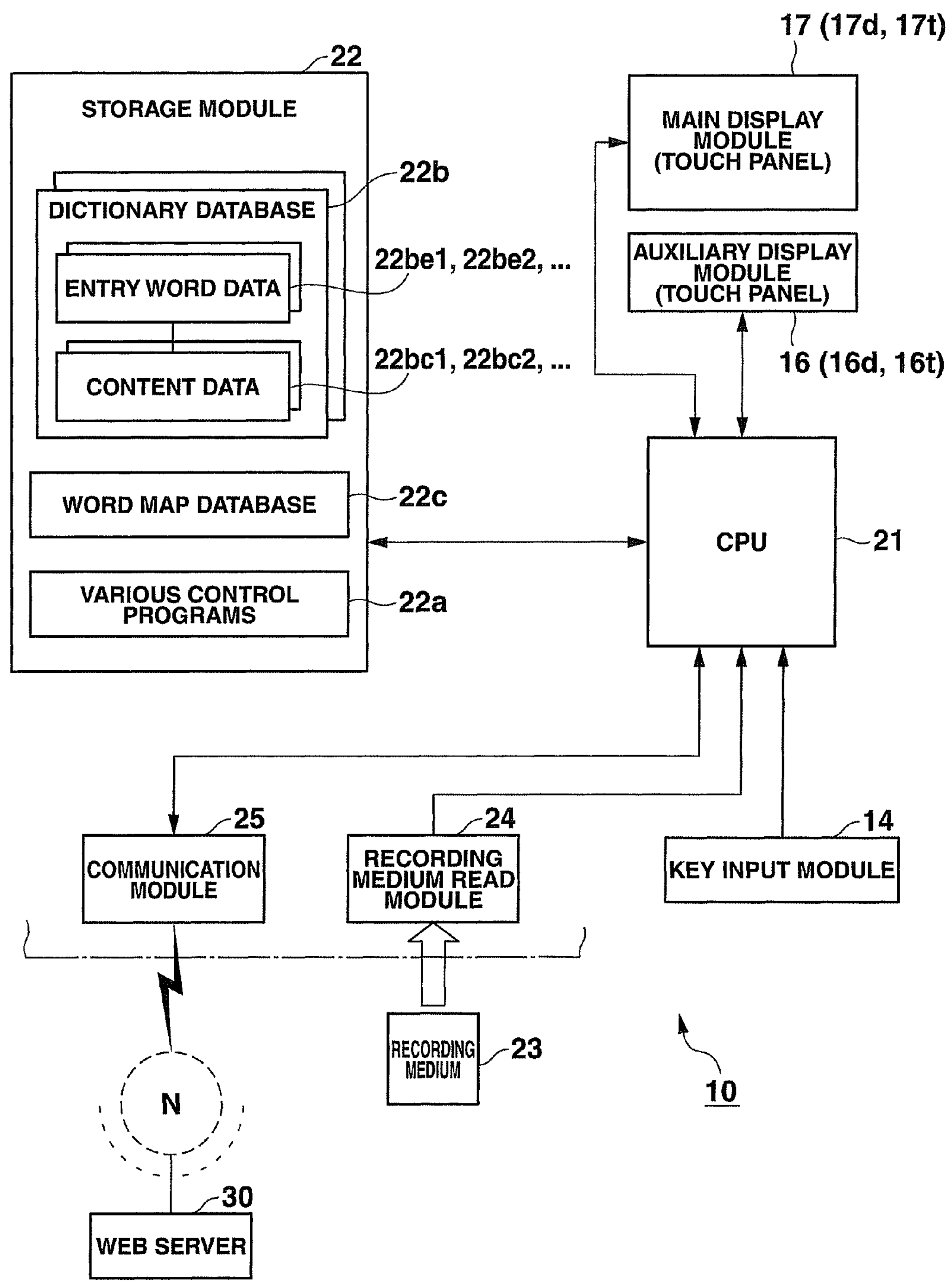
FIG. 2 is a block diagram showing a configuration of the electronic circuitry of the electronic dictionary device 10.

FIG. 2 is a block diagram showing a configuration of the electronic circuitry of the electronic dictionary device 10.

The electronic dictionary device 10 is composed of a computer which reads programs recorded in various recording mediums or transmitted programs and is controlled by the read programs. The electronic circuitry of the electronic dictionary device 10 comprises a central processing unit (CPU) 21.

The CPU 21 controls the operation of each of the various parts of the circuitry according to a device control program prestored in a storage module (flash ROM) 22, a device control program read into the storage module 22 from an external recording medium 23, such as a ROM card, via a recording medium read module 24, or a device control program read into the storage module 22 from a Web server (in this case, a program server) 30 on the Internet N via a communication module 25.

The device control program stored in the storage module 22 is activated in response to an input signal corresponding to a user operation from the key input module 14, touch panel auxiliary display module 16, or touch panel main display module 17, a communication signal from individual Web servers 30 . . . on the Internet with which the storage module 22 is connected via the communication module 25, or a connection communication signal from a memory card (recording medium) 23, such as an EEPROM, a RAM, or a ROM, with which the storage module is externally connected via the recording medium read module 24.

Connected to the CPU 21 are the storage module 22, recording medium read module 24, communication module 25, key input module 14, touch panel auxiliary display module 16 (16*d*, 16*t*), touch panel main display module 17 (17*d*, 17*t*) and others.

Stored as the device control programs in the storage module 22 are a system program that supervises the operation of the entire electronic dictionary device 10 and a communication program for performing data communication with individual Web servers 30 . . . on the Internet N or the user's personal computer (PC) (not shown) via the communication module 25.

Further stored in the storage module 22 is a various information display control program 22*a* for controlling processes in general based on a dictionary database 22*b* and a word map database 22*c* stored in the storage module 22. The processes in general include the process of retrieving an entry word corresponding to an input search string, the process of reading and displaying content information (e.g., a translation or a word meaning) corresponding to the retrieved entry word, the process of displaying linked character strings included in the displayed content information in list form, the process of displaying content information that uses linked character strings displayed in list form and selected as entry words, and the process of entering and displaying a word map that sets entry words at a higher level of hierarchy and linked character strings included in the content information at a lower level of hierarchy.

In the dictionary database 22*b*, various types of dictionary data, including [Japanese-language dictionary], [English-Japanese dictionary], and [Japanese-English dictionary], [Japanese history dictionary], [World history dictionary], and [Encyclopedia], have been previously stored or downloaded and stored. In the various types of dictionary data, individual entry words 22*be*1, 22*be*2, . . . and pieces of content (explanatory) information 22*bc*1, 22*bc*2, . . . are written in such a manner that the former are caused to correspond to the latter.

The content (explanatory) information 22*bcn* of the entry word 22*ben* includes a linked character string Ln. To the linked character string Ln, link information for linking the character string Ln as an entry word in the same dictionary or in another dictionary is added.

In word map database 22*c*, a word map (see FIGS. 7B to 7E and FIGS. 10A to 10E) with a hierarchical structure that has set entry word 22*ben* in the dictionary data at a higher level of hierarchy and linked character strings L1, L2, . . . included in content information 22*bcn* of the entry word 22*ben* at a lower level of hierarchy is entered and stored by a user operation as needed.

In the electronic dictionary device 10 configured as described above, the CPU 21 controls the operation of each part of the circuit according to instructions written in the information display control program 22*a* so as to cause software and hardware to operate in cooperation with each other, thereby realizing functions described below. The information display control program 22*a* includes programs for performing the process of retrieving an entry word corresponding to an input search string, the process of reading and displaying content information corresponding to the retrieved entry word, the process of displaying linked character strings included in the displayed content information in list form, the process of displaying content information that uses linked character strings displayed in list form and selected as entry words, and the process of entering and displaying a word map that sets entry words at a higher level of hierarchy and linked character strings included in the content information at a lower level of hierarchy.

Next, the operation of the electronic dictionary device 10 with the above configuration will be explained.

Figure 3:
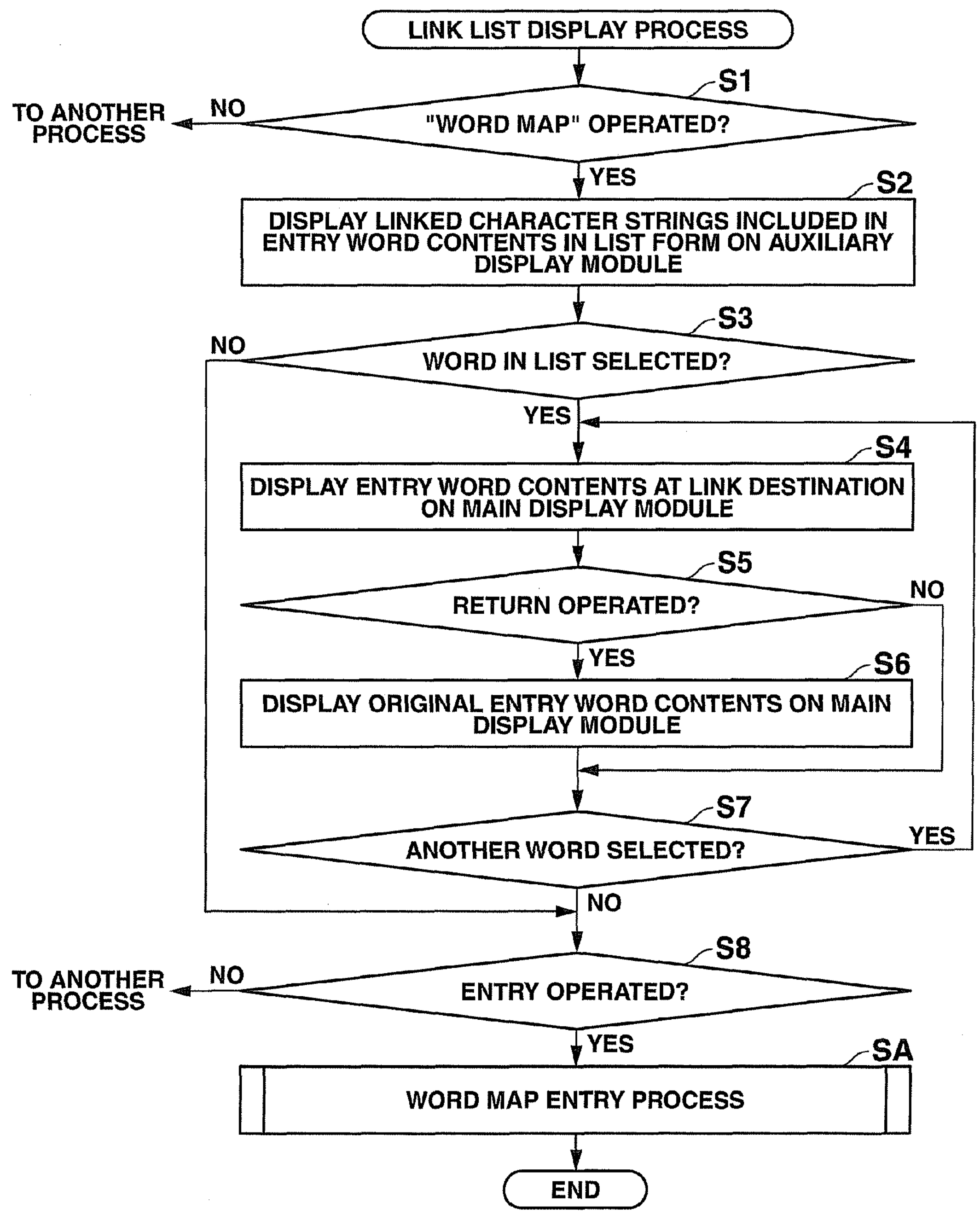
FIG. 3 is a flowchart to explain a link list display process performed according to an information display control program 22*a* of the electronic dictionary device 10.

FIG. 3 is a flowchart to explain a link list display process performed according to the information display control program 22*a* of the electronic dictionary device 10.

Figure 4:
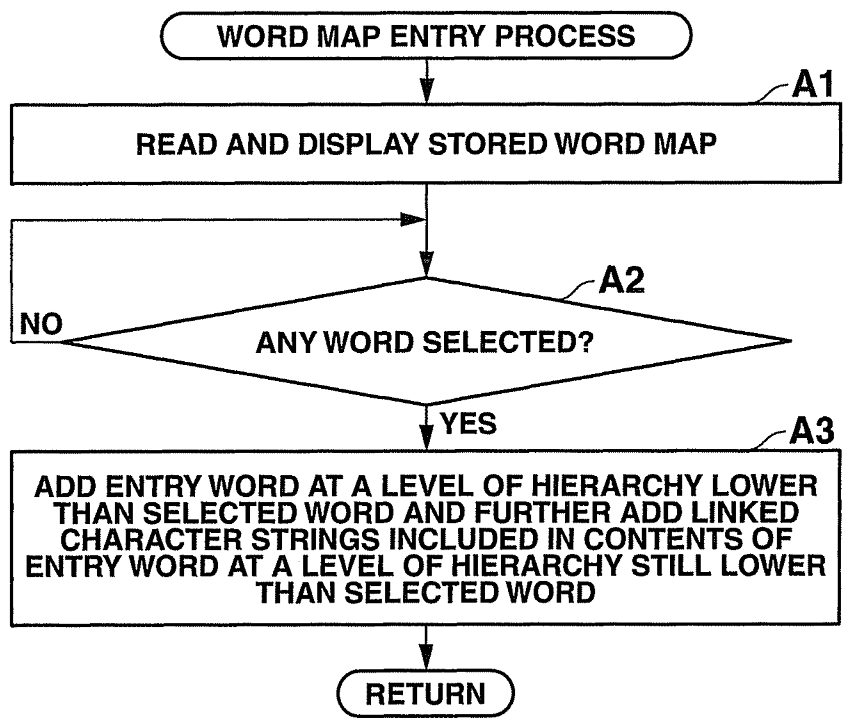
FIG. 4 is a flowchart to explain a word map entry process performed in association with the link list display process of the electronic dictionary device 10.

FIG. 4 is a flowchart to explain a word map entry process performed in association with the link list display process of the electronic dictionary device 10.

Figure 5A:
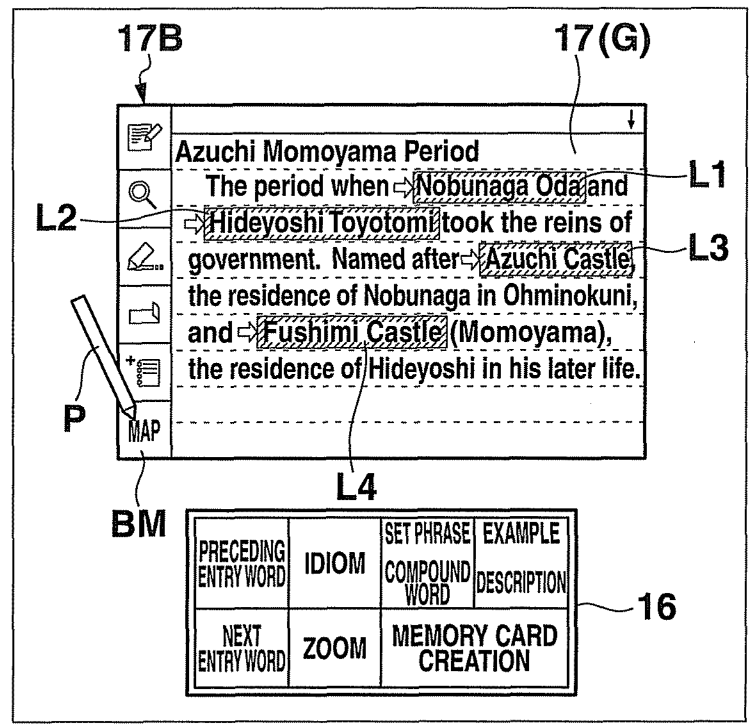
FIGS. 5A and 5B each show a diagram to explain the operation of displaying a link list LL in association with the link list display process of the electronic dictionary device 10.
Figure 5B:
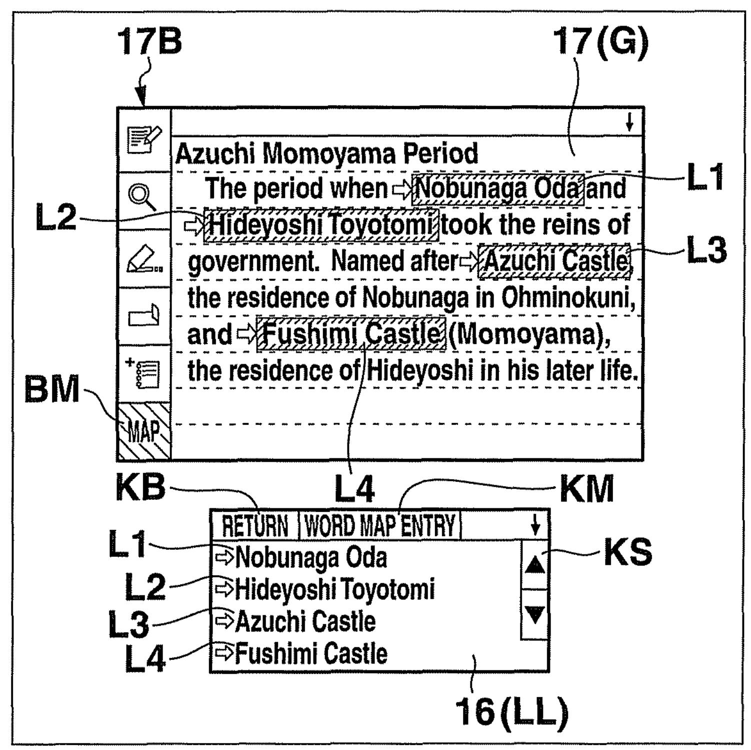

FIGS. 5A and 5B each show a diagram to explain the operation of displaying a link list LL in association with the link list display process of the electronic dictionary device 10.

When, for example, [Japanese history dictionary] has been specified according to a user operation on the dictionary specify keys 14*b*, a content information display screen G corresponding to an arbitrary word "Azuchi Momoyama period" is displayed on the main display module 17 as shown in FIG. 5A. In this state; [Word map] icon BM in touch icon area 17B is touched with a stylus P (Yes in step S1).

Then, as shown in FIG. 5B, a link list LL that lists linked character strings "Nobunaga Oda" L1, "Hideyoshi Toyotomi" L2, "Azuchi Castle" L3, "Fushimi Castle" L4 included in content information on [Azuchi-Momoyama period] is displayed on the auxiliary display module 16 (step S2).

At this time, on the auxiliary display module 16 on which the link list LL has been displayed, a scroll key KS for specifying the scrolling of the link list LL, [Word map entry] key KM for specifying the entry of a word into the word map database 22*c*, and [Return] key KB for specifying the return of an operating state are also displayed.

Figure 6A:
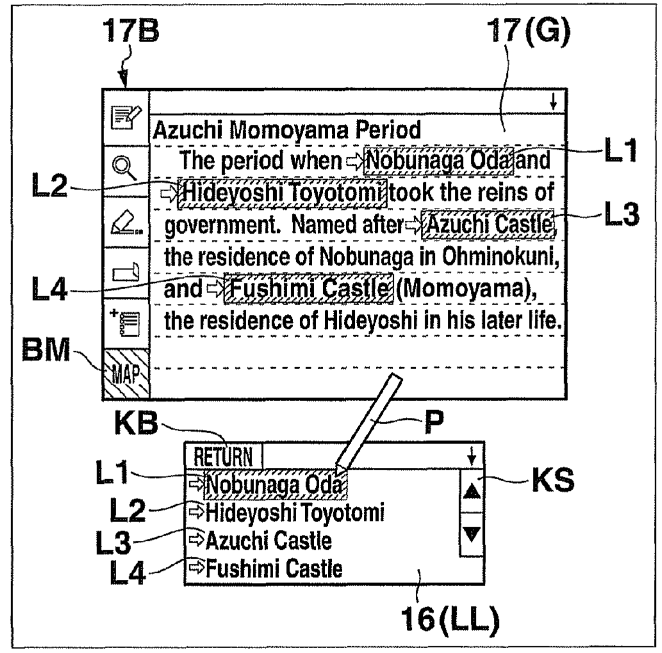
FIGS. 6A, 6B, and 6C each show a diagram to explain the operation of displaying content information (G1) from the link list LL in association with the link list display process of the electronic dictionary device 10.
Figure 6B:
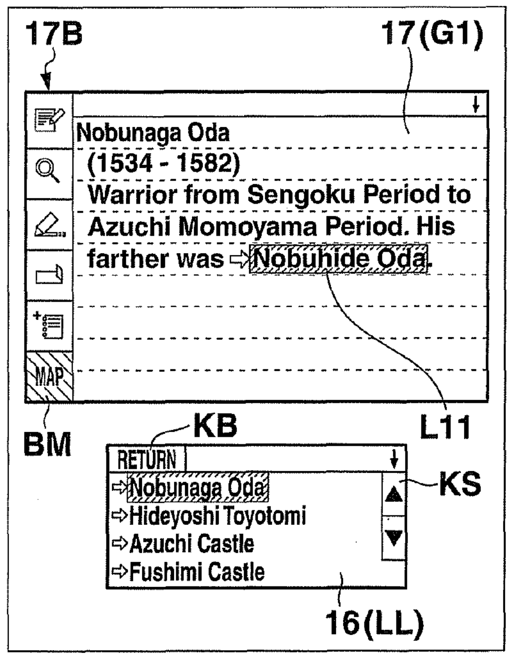
Figure 6C:
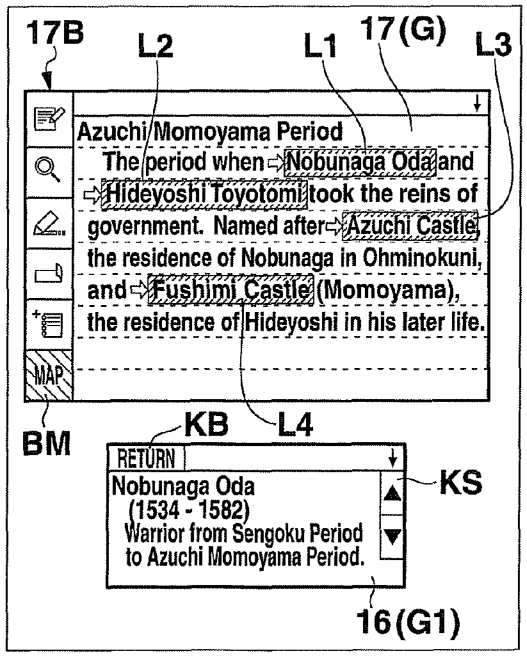

FIGS. 6A, 6B, and 6C each show a diagram to explain the operation of displaying content information (G1) from the link list LL in association with the link list display process of the electronic dictionary device 10.

In FIG. 5B, a content information display screen G for [Azuchi-Momoyama period] in [Japanese history dictionary] is displayed on the main display module 17 and its link list LL is displayed on the auxiliary display module 16. In this state, an arbitrary linked character string (word) [Nobunaga Oda] L1 displayed in the link list LL is touched, selected, and highlighted as shown in FIG. 6A (Yes in step S3).

Then, content information that uses the selected and highlighted linked character string [Nobunaga Oda]L1 as an entry word is read from the specified dictionary [Japanese history dictionary] and displayed on the main display module 17 as a content information display screen G1 for the entry word [Nobunaga Oda] as shown in FIG. 6B (step S4).

Here, when [Return] key KB displayed on the auxiliary display module 16 is touched (Yes in step S5), the content information display screen G for the original entry word [Azuchi-Momoyama period] is displayed again on the main display module 17 as shown in FIG. 6A (step S6).

Then, when one other linked character string (word) Ln is touched and selected from the link list LL displayed on the auxiliary display module 16 (Yes in step S7), content information that uses the selected one other linked character string Ln as an entry word is read from the specified dictionary [Japanese history dictionary] and displayed on the main display module 17 as a content information display screen Gn (step S4).

This enables not only linked character strings L1, L2, . . . included in content information corresponding to an arbitrary entry word retrieved from the dictionary to be checked quite obviously from the link list LL displayed on the auxiliary display module 16 but also a desired linked character string (word) Ln to be easily selected from the link list LL and its content information (G1) to be displayed swiftly.

In this case, since the content information display screen Gn for the linked character string Ln selected from the link list LL is displayed on the main display module 17, while the link list LL is being displayed on the auxiliary display module 16, the work of selecting one other linked character string Lm from the link list LL, changing its content information (Gm) and displaying the changed content information can be done very easily.

As shown in FIG. 6C, while the content information display screen G for the entry word [Azuchi-Momoyama period] including the linked character string L1 selected in step S3 or S7 is being displayed on the main display module 17, the content information display screen G1 that uses the selected linked character string [Nobunaga Oda] L1 as an entry word may be displayed on the auxiliary display module 16.

In this case, the content information display screen G for the original entry word [Azuchi-Momoyama period] and the content information display screen Gn that uses the linked character string Ln included in the screen Gn as an entry word can be seen on the main display module 17 and auxiliary display module 16, while they are compared with each other.

FIGS. 7A, 7B, 7C, 7D, and 7E each show a diagram to explain the operation of entering and displaying a word map from the link list LL in association with a word map entry process of the electronic dictionary device 10.

Figure 7A:
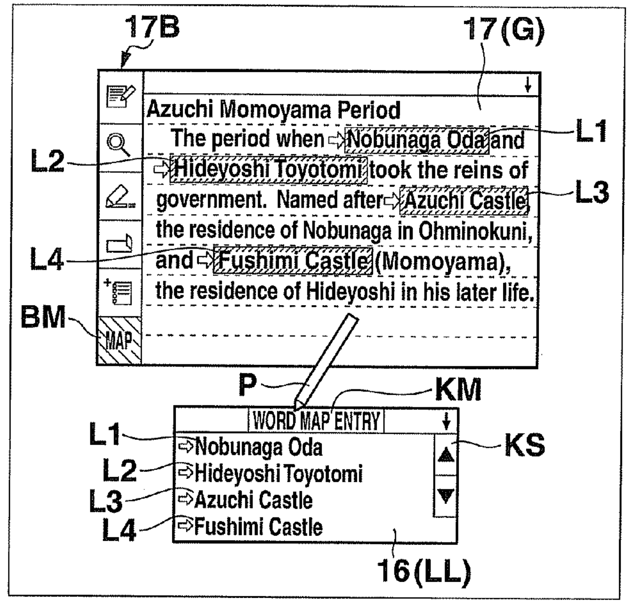
FIGS. 7A, 7B, 7C, 7D, and 7E each show a diagram to explain the operation of entering and displaying a word map from the link list LL in association with a word map entry process of the electronic dictionary device 10.

As shown in FIG. 5B or 6A, while the content information display screen G for the entry word [Azuchi-Momoyama period] in [Japanese history dictionary] is being displayed on the main display module 17 and its link list LL is being displayed on the auxiliary display module 16, when [Word map entry] KM displayed on the auxiliary display module 16 is touched (step S8) as shown in FIG. 7A, control is passed to a word map entry process in FIG. 4 (step SA).

Figure 7B:
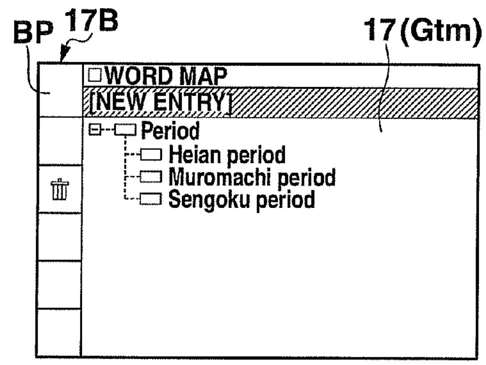

When control has been passed to the word map entry process, first, an entered word map stored in the word map database 22*c* is read and displayed as a word map display screen Gtm on the main display module 17 as shown in, for example, FIG. 7B (step A1).

A concrete example of the word map display screen Gtm of FIG. 7B shows a word map where three linked character strings "Heian period," "Muromachi period," "Sengoku period" included in content information on the entry word [Period] are entered at a lower level of hierarchy caused to correspond to the entry word "Period."

Figure 7D:
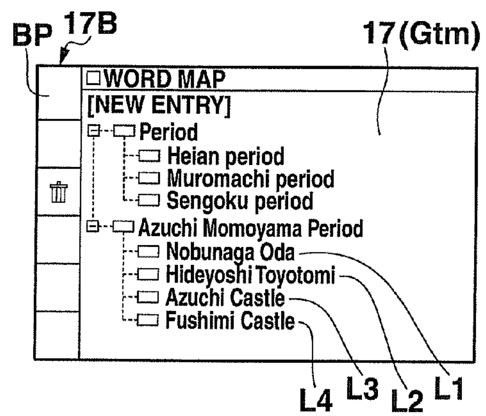
Figure 7C:
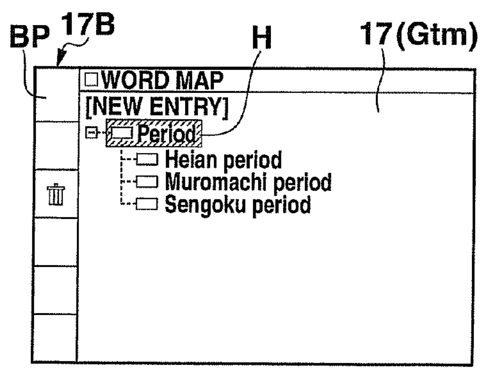

On the word map display screen Gtm, the display position of a reversed cursor H is moved to the position of an arbitrary word suitably by a touch operation on the display screen Gtm or by operating the cursor keys 14*e*, a word at a level of hierarchy to be entered in the word map this time is selected, and [Translate/Confirm] key 14*c* is operated (Yes in step A2) as shown in, for example, FIG. 7B or 7C.

Figure 7E:
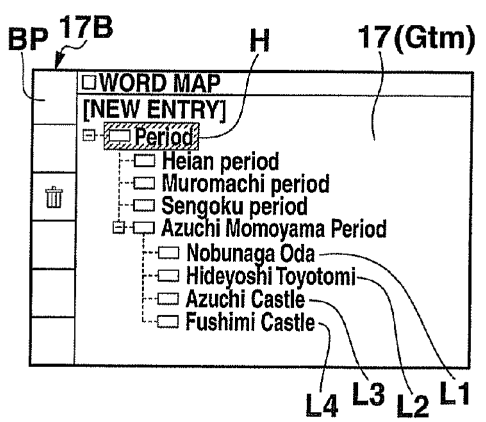

Then, as shown in FIG. 7D or 7E, the entry word "Azuchi Momoyama period" displayed on the content information display screen G of the main display module 17 at the time [Word map entry] key KM was touched is added at a level of hierarchy lower than the selected word. In addition, the linked character strings "Nobunaga Oda" L1, "Hideyoshi Toyotomi" L2, "Azuchi Castle" L3, "Fushimi Castle" L4 included in content information on the entry word are added at a level of hierarchy lower than the preceding level of hierarchy and entered (step A3).

As a result, an arbitrary entry word and linked character strings included in its content information can be entered in the word map database 22*c* not only as an easy-to-read word map caused to correspond to the hierarchical structure but also in such a manner that they are related to words at an arbitrary level of hierarchy in an already entered word map.

Figure 8:
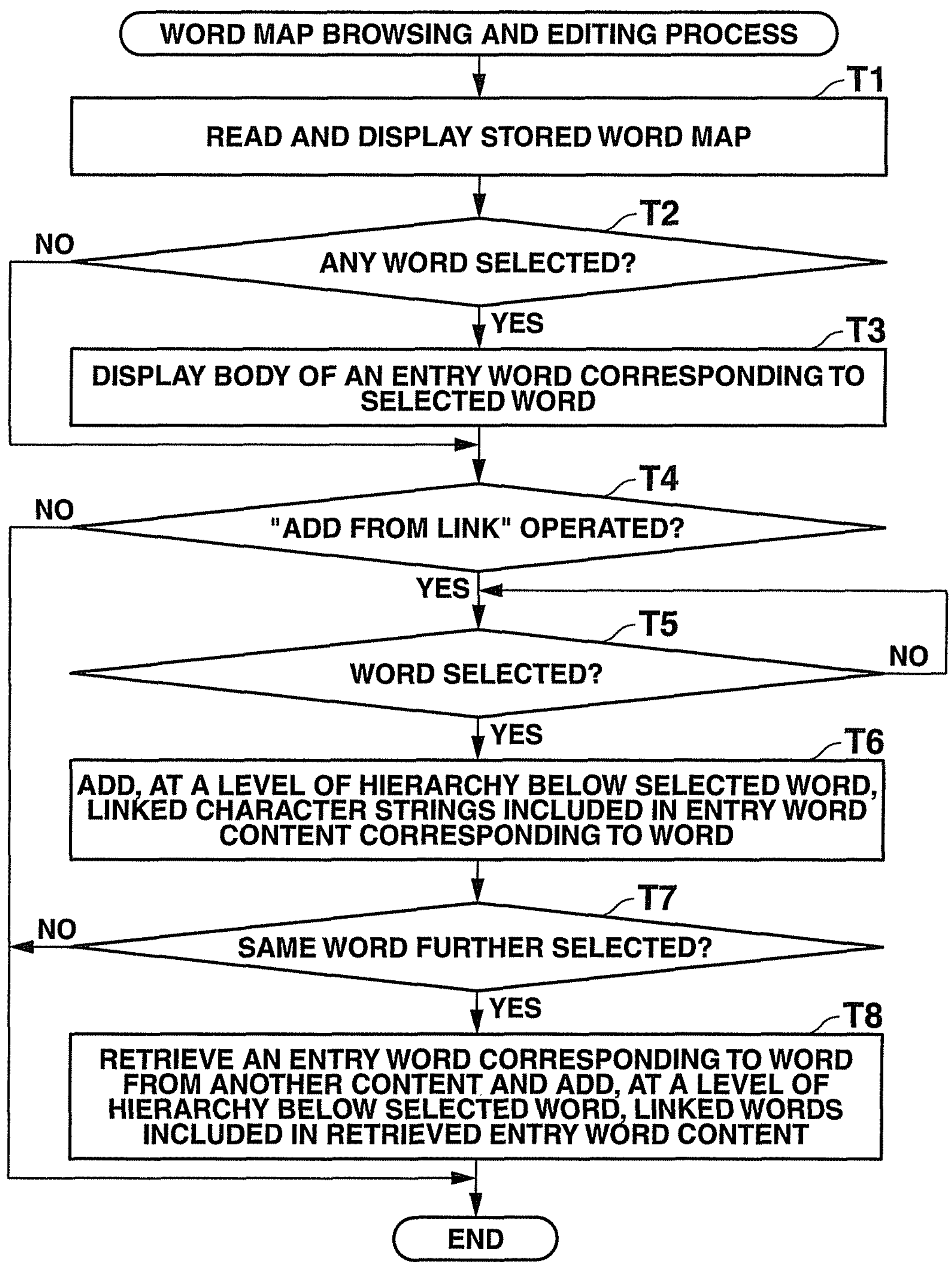
FIG. 8 is a flowchart to explain a word map browsing and editing process performed according to the information display control program 22*a* of the electronic dictionary device 10.

FIG. 8 is a flowchart to explain a word map browsing and editing process performed according to the information display control program 22*a* of the electronic dictionary device 10.

FIGS. 9A, 9B, 9C, and 9D each show a diagram to explain the operation of browsing and displaying a word map in association with the word map browsing and editing process of the electronic dictionary device 10.

Figure 9A:
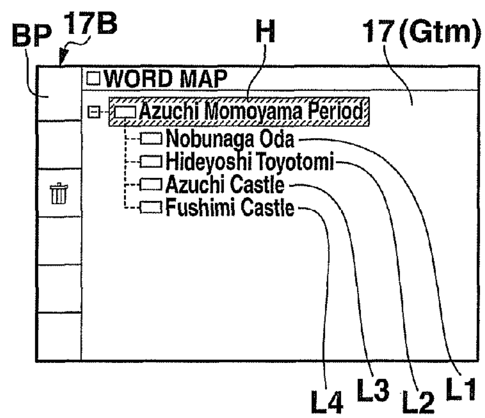
FIGS. 9A, 9B, 9C, and 9D each show a diagram to explain the operation of browsing and displaying a word map in association with the word map browsing and editing process of the electronic dictionary device 10.

When [Word map browse] is selected from a menu screen (not shown) displayed on the main display module 17 as a result of the operation of [Study book] key included in the dictionary specify keys 14*b* and a word map browsing mode is activated, a word map stored in the word map database 22*c* is read and displayed as a word map display screen Gtm on the main display module 17 as shown in, for example, FIG. 9A (step T1).

A concrete example of the word map display screen Gtm of FIG. 9A shows a word map where the entry word "Azuchi Momoyama period" of [Japanese history dictionary] is set at a higher level of hierarchy and four linked character strings "Nobunaga Oda" L1, "Hideyoshi Toyotomi" L2, "Azuchi Castle" L3, "Fushimi Castle" L4 included in content information (see FIG. 7A) on the entry word [Azuchi Momoyama period] are entered at a level of hierarchy just below the preceding level.

Figure 9C:
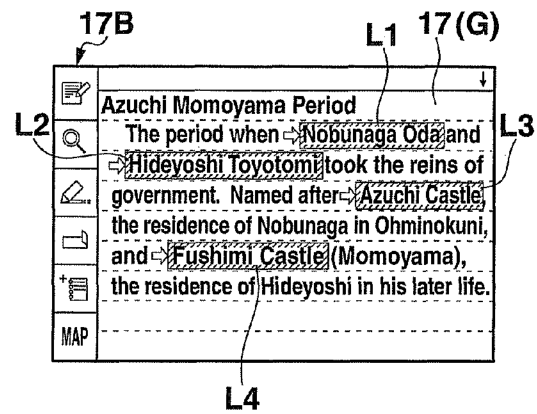
Figure 9B:
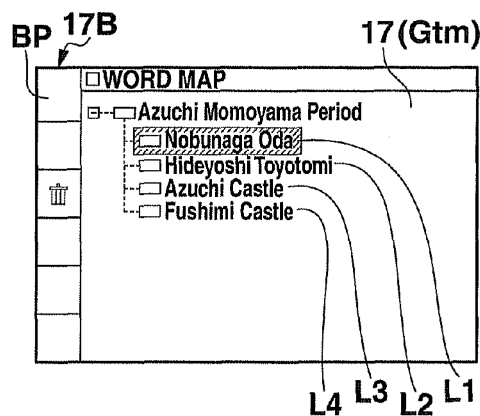

On the word map display screen Gtm, the display position of a reversed cursor H is moved to the position of an arbitrary word suitably by a touch operation on the display screen Gtm or by operating the cursor keys 14*e*, and [Translate/Confirm] key 14*c* is operated (Yes in step T2) as shown in, for example, FIG. 9A or 9B.

For example, as shown in FIG. 9A, the word "Azuchi Momoyama period" at a higher level of hierarchy in the word map displayed on the word map display screen Gtm is selected and confirmed (Yes in step T2), content information that uses the selected word [Azuchi Momoyama period] as an entry word is read and displayed as a content information display screen G on the main display module 17 as shown in FIG. 9C (step T3).

Figure 9D:
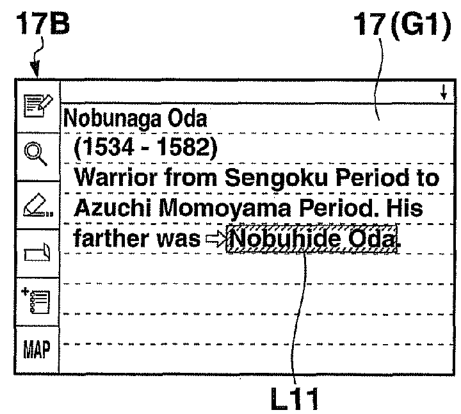

In addition, as shown in FIG. 9B, when the word "Nobunaga Oda" L1 at a lower level of hierarchy in the word map displayed on the word map display screen Gtm is selected and confirmed (Yes in step T2), content information that uses the selected word [Nobunaga Oda] L1 as an entry word is read and displayed as a content information display screen G1 on the main display module 17 as shown in FIG. 9D (step T3).

The word map display screen Gtm may be displayed on the auxiliary display module 16 and a content information display screen Gn that uses a word Ln selected from the word map on the auxiliary display module 16 as an entry word may be displayed on the main display module 17.

This makes it possible to easily display an easy-to-read word map display screen Gtm where an arbitrary entry word and linked character strings included in its content information are organized into a hierarchical structure in such a manner that the former is caused to correspond to the latter. In addition to this, selecting an arbitrary word from the display screen Gtm for the word map enables content information that uses the selected word as an entry word to be displayed and browsed easily.

FIGS. 10A, 10B, 100, 10D, and 10E each show a diagram to explain the operation of editing and displaying a word map in association with the word map browsing and editing process of the electronic dictionary device 10.

Figure 10A:
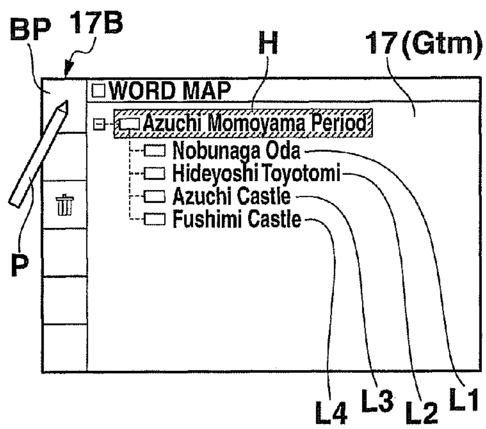
FIGS. 10A, 10B, 10C, 10D, and 10E each show a diagram to explain the operation of editing and displaying a word map in association with the word map browsing and editing process of the electronic dictionary device 10.

For example, as shown in FIG. 10A, when the word map browsing mode is activated, a word map where the entry word "Azuchi Momoyama period" of [Japanese history dictionary] is set at a higher level of hierarchy and four linked character strings "Nobunaga Oda" L1 to "Fushimi Castle" L4 included in its content information (see FIG. 7A) are entered at a lower level of hierarchy is read from the word map database 22*c* and displayed as a word map display screen Gtm on the main display module 17 (step T1).

In this state, [Add from link] icon BP displayed in the touch icon area 17B of the main display module 17 is touched (Yes in step T4). Then, as shown in FIG. 10B or 10C, the display position of a reversed cursor H is moved to the position of an arbitrary word suitably by a touch operation on the word map display screen Gtm or by operating the cursor keys 14*e*, and [Translate/Confirm] key 14*c* is operated (Yes in step T5).

Figure 10B:
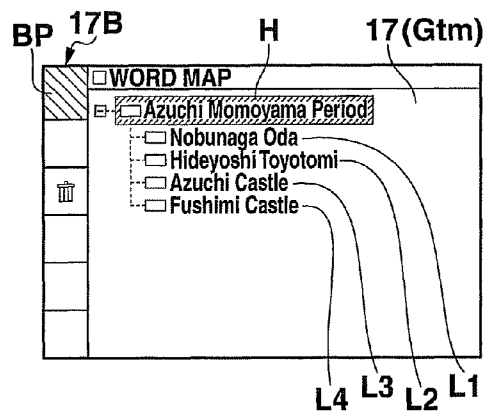
Figure 10D:
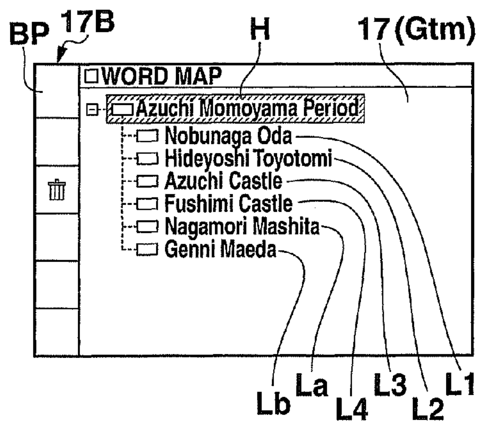
Figure 10C:
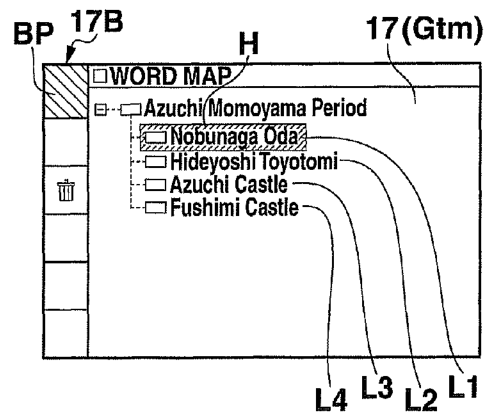

For example, as shown in FIG. 10B, when the word "Azuchi Momoyama period" at a higher level of hierarchy in [Japanese history dictionary] on the word map displayed on the word map display screen Gtm is selected and confirmed (Yes in step T5), linked character strings [Nobunaga Oda] L1 to [Fushimi Castle] L4 included in content information in the same dictionary [Japanese history dictionary] using the same word as an entry word are extracted and are added and entered at a level of hierarchy below the selected word [Azuchi Momoyama period] as shown in FIG. 10D (step T6).

In a concrete example of FIG. 10D, since linked character strings [Nobunaga Oda] L1 to [Fushimi Castle] L4 included in content information on the word [Azuchi Momoyama period] in the selected [Japanese history dictionary] have already been entered in the map, it is determined that the same word [Azuchi Momoyama period] has been further selected (Yes in step T7).

Then, an entry word that coincides with the word [Azuchi Momoyama period] is retrieved from another dictionary content (in this case, [Encyclopedia]) and linked character strings "Nagamori Mashita" La, "Genni Maeda" Lb included in its content information are extracted and further added and entered at a level of hierarchy below the word [Azuchi Momoyama period] in the selected [Japanese history dictionary] (step T8).

Figure 10E:
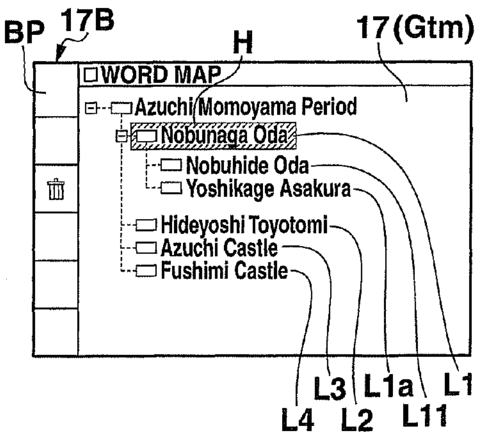

In addition, as shown in FIG. 10C, when the word "Nobunaga Oda" L1 at a lower level of hierarchy in [Japanese history dictionary] on the word map displayed on the word map display screen Gtm is selected and confirmed (Yes in step T5), a linked character string "Nobuhide Oda" L11 included in content information in the same dictionary [Japanese history dictionary] using the same word [Nobunaga Oda] L1 as an entry word is extracted and is added and entered at a level of hierarchy below the selected word [Nobunaga Oda] L1 (step T6) as shown in FIG. 10E.

Here, when it has been determined that the same word ("Nobunaga Oda" L1 in [Japanese history dictionary]) on the word map currently being displayed has been selected again, because [Translate/Confirm] key 14*c* has been operated again (Yes in step T7), an entry word that coincides with the word [Nobunaga Oda] L1 is retrieved from another dictionary content (in this case, [Encyclopedia]). A linked character string "Yoshikage Asakura" L1*a* included in the retrieved content information is extracted and is added and entered at a level of hierarchy below the word [Nobunaga Oda] L1 in the selected [Japanese history dictionary] (step T8).

This makes it possible to add and enter a linked character string included in content information that uses the desired word as an entry word at a level of hierarchy below the desired word at a desired level of hierarchy on a word map already entered in the word map database 22*c*. In addition, this enables the user to create an original word map by adding important character strings related to the desired word.

In this case, when a word Ln in an arbitrary dictionary on a word map in which the user wants to additionally enter a linked character string is selected and confirmed for the first time, linked character strings Ln1, Ln2, . . . included in content information that uses the corresponding word Ln in the same dictionary as an entry word are extracted and additionally entered in a layer lower than the word Ln. Then, when the word Ln is selected and confirmed for the second time, linked character strings Lna, Lnb, . . . included in content information that uses the word Ln retrieved from another dictionary by matching as an entry word are extracted and additionally entered in the layer lower than the word Ln. Therefore, a hierarchical structure of a word map is added in relevancy ranked order of the same dictionary contents, which enables the user to create an original word map that meets the user's purpose.

While the hierarchical structure of a word map in the embodiment has been configured to have the relationship between an entry word of a dictionary and linked character strings included in its content information, individual words in a dictionary which have been caused by the user to have an arbitrary relationship between them may be organized into an arbitrary hierarchical structure.

The methods of the processes performed by the electronic dictionary device 10 and the databases written in the embodiment, that is, the individual methods of the link list display process shown in the flowchart of FIG. 3, the word map entry process performed in association with the link list display process shown in the flowchart of FIG. 4, the word map browsing and editing process shown in the flowchart of FIG. 8, and the dictionary database 22*b*, can be stored in an external recording medium 23, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered. A computer loads the program stored in the external recording medium 23 into the storage module (22). The computer is controlled by the read-in program, thereby realizing the function of listing linked character strings in information, the function of displaying content information based on the list, and the function of entering and browsing a word map that organizes linked character strings and link-source entry words into a hierarchical structure in such a manner that the former and the latter are caused to correspond to each other, which enables similar processes by the aforementioned methods to be carried out.

Furthermore, the data of the programs which realize the above methods can be transferred in the form of program code through a network N. The program data can be loaded by the communication module 25 into a computer connected to the network N, thereby realizing the function of listing linked character strings in information, the function of displaying content information based on the list, and the function of entering and browsing a word map that organizes linked character strings and link-source entry words into a hierarchical structure in such a manner that the former and the latter are caused to correspond to each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic dictionary device comprising:

a first display module;

a second display module;

a dictionary data storage module which stores dictionary data that associates an entry word with explanatory information on the entry word, the explanatory information including link character strings linked to other entry words;

a word map storage module that stores a word map on which the entry word and the link character strings of the explanatory information included in the dictionary data are associated with one another in a hierarchical structure specified by a user; and a processor which has functions to be performed by execution of a program, the functions comprising:

a first explanatory information display function of displaying, on the first display module, explanatory information on an entry word selected by a user;

a list display function of displaying, on the second display module, a list of link character strings included in the displayed explanatory information;

a second explanatory information display function of displaying, on the first display module, explanatory information on an entry word linked to one link character string that is selected from the displayed list by a user;

a word map entry function of (i) displaying on the first display module the word map stored in the word map storage module when an instruction of displaying the word map is received in a mode of the list of link character strings being displayed on the second display module, and (ii) when a hierarchy for a word that is included in the displayed word map is specified, entering, the list displayed by the list display function and the entry word for the explanatory information including the link character strings of the displayed list, into the hierarchy specified on the word map, so that the entry word is at a higher level and the list is at a lower level in the hierarchical structure;

a word map display function of displaying, on the first display module, the word map in which the displayed list is entered; and a third explanatory information display function in which when a user selects one link character string from the displayed word map, explanatory information on an entry word linked to the selected link character string is displayed on first display module in place of the displayed word map.

2. The electronic dictionary device of claim 1, wherein the first display module is a main display module, and the second display module is an auxiliary display module.

3. A non-transitory recording medium which records a program for controlling a computer, the program, when being executed by the computer, realizing functions of:

utilizing the computer for an electronic dictionary, the computer comprising a first display module, a second display module, and a dictionary data storage module which stores dictionary data that associates an entry word with explanatory information on the entry word and a word map storage module that stores a word map on which the entry word and the link character strings of the explanatory information included in the dictionary data are associated with one another in a hierarchical structure specified by a user, a first explanatory information display function of displaying, on the first display module, explanatory information on an entry word selected by a user;

a list display function of displaying, on the second display module, a list of link character strings included in the displayed explanatory information;

a second explanatory information display function of displaying, on the first display module, explanatory information on an entry word linked to one link character string that is selected from the displayed list by a user;

a word map entry function of (i) displaying on the first display module the word map stored in the word map storage module when an instruction of displaying the word map is received in a mode of the list of link character strings being displayed on the second display module, and (ii) when a hierarchy for a word that is included in the displayed word map is specified, entering, the list displayed by the list display function and the entry word for the explanatory information including the link character strings of the displayed list, into the hierarchy specified on the word map, so that the entry word is at a higher level and the list is at a lower level in the hierarchical structure;

a word map display function of displaying, on the first display module, the word map in which the displayed list is entered; and a third explanatory information display function in which when a user selects one link character string from the displayed word map, explanatory information on an entry word linked to the selected link character string is displayed on first display module in place of the displayed word map.

4. A method comprising:

displaying explanatory information in an electronic dictionary device comprising a first display module, a second display module, and a dictionary data storage module which stores dictionary data that associates an entry word with explanatory information on the entry word and a word map storage module that stores a word map on which the entry word and the link character strings of the explanatory information included in the dictionary data are associated with one another in a hierarchical structure specified by a user, the explanatory information including link character strings linked to other entry words;

displaying, on the first display module, explanatory information on an entry word selected by a user;

displaying, on the second display module, a list of link character strings included in the displayed explanatory information;

displaying, on the first display module, explanatory information on an entry word linked to one link character string that is selected from the displayed list by a user;

displaying on the first display module the word map stored in the word map storage module when an instruction of displaying the word map is received in a mode of the list of link character strings being displayed on the second display module;

entering, when a hierarchy for a word that is included in the displayed word map is specified, the displayed list and the entry word list for the explanatory information including the link character strings of the displayed list, into the hierarchy specified on the word map, so that the entry word is at a higher level and the list is at a lower level in the hierarchical structure;

displaying, on the first display module, the word map in which the displayed list is entered; and when a user selects one link character string from the displayed word map, displaying, on first display module, explanatory information on an entry word linked to the selected link character string in place of the displayed word map.

* * * * *